(12) United States Patent
Kadowaki

(10) Patent No.: US 7,242,121 B2
(45) Date of Patent: Jul. 10, 2007

(54) BRUSHLESS MOTOR WITH SPEED DETECTOR HAVING NOISE CANCEL PATTERN

(75) Inventor: Koji Kadowaki, Sakaiminato (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 9 days.

(21) Appl. No.: 11/154,588

(22) Filed: Jun. 17, 2005

(65) Prior Publication Data

US 2006/0006747 A1    Jan. 12, 2006

(30) Foreign Application Priority Data

Jul. 8, 2004 (JP) .............................. 2004-201231

(51) Int. Cl.
*H02K 29/00* (2006.01)
*H02K 21/24* (2006.01)

(52) U.S. Cl. ............. 310/68 B; 310/68 R; 310/156.05; 318/254

(58) Field of Classification Search ............... 310/68 R, 310/68 B, 156.05; 318/138, 254, 439, 721, 318/727; 324/166
See application file for complete search history.

(56) References Cited

U.S. PATENT DOCUMENTS 4,668,884 A * 5/1987 Amao et al. ............... 310/68 R
2001/0019230 A1* 9/2001 Furuki ....................... 310/68 B

FOREIGN PATENT DOCUMENTS

| JP | 61269657 A | * | 11/1986 | ............... 310/68 B |
| JP | 04033552 A | * | 5/1990 | ............... 310/68 B |
| JP | 07327351 | | 12/1995 | |
| JP | 08088964 | | 4/1996 | |
| JP | 08172763 | | 7/1996 | |

* cited by examiner

*Primary Examiner*—Tran Nguyen
(74) *Attorney, Agent, or Firm*—Steptoe & Johnson LLP

(57) ABSTRACT

A drive/control circuit integrated brushless motor is provided that has high rotating precision, satisfactory noise resistance and high output, and is suited to be smaller to save as much space as possible. The motor is a brushless motor provided with circuit integrated core with an FG pattern formed uniformly along the entire circumference by including a pattern system FG, and arranging a Hall element on a surface of a circuit substrate opposite the surface formed with the FG pattern and a noise cancel pattern.

7 Claims, 14 Drawing Sheets

BRUSHLESS MOTOR WITH SPEED DETECTOR HAVING NOISE CANCEL PATTERN

BACKGROUND OF THE INVENTION

1. Field of the Invention

The invention relates to a brushless motor used as a main motor for simultaneously driving various mechanisms such as a copying machine and a laser beam printer. More particularly, the invention relates to a brushless motor including a stator core (iron core) around which a stator coil is wound, a rotor attached with a ring-shaped magnet, a Hall element for detecting the position of the rotor, and a speed detector for detecting the rotating speed of the rotor, and integrally incorporating a drive/control circuit for rotatably driving and controlling the rotor and a motor.

2. Description of the Related Art

Recently, document products such as a copying machine and a laser beam printer are oriented to have high image quality, high-speed printing and coloring, and to simultaneously realize such, tend to use a so-called tandem system that includes a photosensitive drum for each color. The conventional configuration including one drum now is a configuration including two drums or four drums, and thus the apparatus unavoidably becomes larger. To suppress such enlargement, however, the main motor for driving various mechanisms is required to be thinner, smaller, to save as much space as possible, and to have high output.

The brushless motor integrally incorporating a motor section including a stator equipped with a stator core (iron core) suitable for high output, and a drive/control circuit for rotatably driving and controlling the motor is generally used as the main motor, and the entire motor including the circuit section is required to be thinner, smaller, to save as much space as possible, and to have high output.

To this end, the outside dimension of the stator part of the motor section and the circuit section is desirably made as close as possible to the dimension of a square circumscribing the rotor part, and similarly, the height dimension is desirably made as close as possible to the height dimension of the rotor part.

Conventionally, the well-known brushless motor including the stator core (iron core) includes a rotor in which a ring-shaped magnet having a plurality of magnetic poles facing the stator core (iron core) is provided on the inner peripheral surface of the rotor yoke and a stator assembly in which the stator coil (armature coil) is wound around each stator core (iron core). The stator assembly is attached to a circuit substrate (stator base) equipped with a Hall element (position detecting element) and a drive circuit for rotatably driving the rotor by way of a housing (bearing holder). The rotating position of the rotor is detected by detecting the magnetic pole of the magnet of the rotor with the Hall element (position detecting element), and from the drive circuit to where the output signal of the Hall element is input, the drive current controlled in accordance with the output signal of the Hall element (position detecting element) is supplied to the stator coil (armature coil). The stator coil (armature coil) then generates a magnetic field corresponding to the rotating position of the rotor. The rotor is configured (hereinafter referred to as a first conventional art) so that a continuous rotating force is generated by the interaction of the magnetic field generated by the stator coil (armature coil) and the magnetic pole of the magnet (refer to e.g., JP-A 8-88964 (1996).).

FIG. 6 shows a configuration of a conventional brushless motor.

In FIG. 6, reference character 1 refers to a shaft, reference character 2 refers to a rotor yoke, reference character 3 refers to a magnet, reference character 4 refers to a stator coil (armature coil), reference character 5 refers to a stator core (iron core), reference character 6 refers to a Hall element (position detecting element), reference character 7 refers to a drive circuit, reference character 8 refers to a circuit substrate (stator base), reference character 9 refers to a bearing, and reference character 10 refers to a housing (bearing holder).

In the conventional brushless motor, the Hall element 6 is arranged at a position where the magnetic flux of the magnet 3 of the rotor is easily picked up, that is, on the inner diameter side of the magnet 3 on the surface side facing the magnet 3 of the circuit substrate (stator base) 8 to obtain the output necessary for position detection from the Hall element (position detecting element) 6. When arranged at such position, however, the Hall element (position detecting element) 6 is also arranged close to the stator coil (armature coil) 4, and thus the magnetic field generated by the excitation of the stator coil (armature coil) 4 influences the Hall element 6 as a noise, and a stable position detection may not be performed.

As high output is required, particularly, in the brushless motor used as a so-called main motor for simultaneously driving various mechanisms such as a copying machine and a laser beam printer, a large amount of current must flow to the stator coil (armature coil) 4. If the drive current is increased, however, the magnetic field generated at the stator coil (armature coil) 4 becomes large, which generated magnetic field influences the Hall element 6, thereby making a stable position detection difficult.

As shown in FIG. 7, a solution for the above problem includes a technique (hereinafter referred to as a second conventional art) for preventing the magnetic field generated by the excitation of the stator coil (winding wire) 4 from influencing the Hall element (detecting element) as noise with a configuration in which one portion of the magnet 3 arranged in the rotor yoke 2 is exposed from the rotor yoke 2, the Hall element (detecting element) 6 is arranged exterior to the magnet 3 in correspondence to the exposed portion of the magnet 3, and the leakage flux of the exposed portion of the magnet is detected (refer to e.g., JP-A 8-172763 (1996)).

Further, a solution different from the second conventional art includes a technique (hereinafter referred to as a third conventional art) in which the magnetic field generated by the excitation of the stator coil (driving coil) 4 is assumed to influence the output waveform of the Hall element (position detecting element) 6 thus producing deformation at a zero cross point of the output waveform, the deformation being produced in a direction that delays the current feed switching timing toward the stator coil (driving coil) 4, and as shown in FIGS. 8 and 9, a driving magnet 3*a* and a position detecting magnet 3*b* are arranged as the magnet (driving magnet) 3 of the rotor in such a way that the boundaries where the magnetic poles are opposite poles with respect to each other contact, thereby eliminating the delay of current feed switching by inversing the output of the Hall element (position detecting element) 6 so that the deformation of the output waveform is produced in a direction that accelerates the current feed switching toward the stator coil (armature coil) 4 (refer to e.g., JP-A 7-327351 (1995)).

More specifically, as shown in FIG. 9, the driving magnet 3*a* and the position detecting magnet 3*b* are arranged on the magnet (driving magnet) 3 of the rotor in such a way that the boundaries where the magnetic poles are opposite poles with respect to each other contact. Further, the Hall element (position detecting element) 6 is arranged on the circuit substrate (substrate) 8 at a position facing both the position detecting magnet 3b and the stator core 5 with which the stator coil (driving coil) 4 is wound. The planar arrangement of the Hall element 6 is configured as shown in FIG. 10, where the Hall element (detecting element) 6U of U phase, the Hall element (detecting element) 6V of V phase, and the Hall element (detecting element) 6W of W phase are arranged in correspondence to the each teeth of the U phase, the V phase and the W phase of the stator core (iron core) 5. The arrow indicates the direction of rotation.

According to this configuration, the composite magnetic field of the magnetic field generated by the excitation of the stator coil (driving coil) 4 and the magnetic field of the position detecting magnet 3b is detected by the Hall element (position detecting element) 6, thereby eliminating the delay of current feed switching toward the stator coil (driving coil) 4.

FIGS. 11A to 11G (FIGS. 9A to 9G of JP-A 7-327351 (1995)) shows that the magnetic field of the U phase and the W phase generated by the excitation of the stator coil (winding wire) 4 influences the output waveform of the Hall element (detecting element) 6U of the U phase, thus producing deformation at the zero cross point of the output waveform. The deformation is produced in a direction that delays the current feed switching timing toward the stator coil (driving coil) 4. FIG. 11A is the generated magnetic field of the driving magnet toward the Hall element (detecting element) 6U, FIG. 11B is the generated magnetic fields of the U and W phase cores, FIG. 11C is the generated magnetic field of the U and W phase cores toward the Hall element (detecting element) 6U, FIG. 11D is the generated magnetic field of the composite cores of U and W phases toward the Hall element (detecting element) 6U, FIG. 11E is the output waveform of the Hall element (detecting element) 6U, FIG. 11F is an enlarged view of the horizontal axis of the main part of FIG. 11E, and FIG. 11G is the generated magnetic field of the actual W phase core.

FIGS. 12A to 12E (FIGS. 3A to 3E of JP-A 7-327351 (1995)) show that the output of the Hall element (position detecting element) is inversed and the deformation of the output waveform is produced in a direction that accelerates the current feed switching toward the stator coil (driving coil). FIGS. 12A and 12B show the magnetic field toward the Hall element (detecting element) 6U and the magnetic field toward the core, FIG. 12C shows an output waveform of the Hall element (detecting element) 6U, FIG. 12D shows an enlarged view of the horizontal axis of the main part of FIG. 12C, and FIG. 12E shows an enlarged view of the generated magnetic field of the W phase core.

In the brushless motor used as the main motor for simultaneously driving various mechanisms such as a copying machine and a laser beam printer, not only the rotating speed of the motor, but the rotating phase in relation with the various mechanism sections of the apparatus driven by way of an output shaft and a decelerating mechanism attached to the output shaft must also be accurately controlled. Thus, the brushless motor requires a speed detector having a certain degree of resolution.

The speed detector of the brushless motor suited for the above application includes a so-called pattern FG system. The ring-shaped FG magnet subjected to NS multi-pole magnetization along the circumferential direction is arranged on the rotor side, the FG pattern including the generator wire elements of the same number as the magnetized poles of the FG magnet connected in series along the circumferential direction is arranged on the stator side, and the speed detecting signal (FG signal) of the frequency proportional to the rotating number of the motor produced in the FG pattern by the rotation of the motor is obtained. When incorporating the speed detector of the FG pattern system in the brushless motor, a configuration in which the driving magnet of the motor and the FG magnet are integrated by performing magnetization for the driving magnet on the inner peripheral side of the rotor magnet and NS multi-pole magnetization for the FG magnet (hereinafter referred to as FG magnetization) on the end face side, and the FG pattern is formed on the circuit substrate of the motor is desirable as a configuration with no influence on the shape of the motor and no additional component.

However, in either of the second conventional art and the third conventional art, an adverse effect arises due to performing FG magnetization on the end face on the circuit substrate (substrate) side of the magnet (driving magnet) of the rotor.

That is, the Hall element (position detecting element) must be arranged in the vicinity of the end face on the circuit substrate (substrate) side of the magnet (driving magnet) of the rotor, and thus the influence of FG magnetization formed on the end face of the magnet (driving magnet) of the rotor cannot be avoided, and a stable position detection becomes difficult.

In the second conventional art, the influence of FG magnetization can be prevented by spacing the Hall element (position detecting element) away from the magnet (driving magnet) of the rotor to an extent the influence of FG magnetization can be neglected with the dimension of one portion of the magnet of the rotor exposed from the rotor yoke being sufficiently large to an extent the influence of the FG magnetization can be neglected, but when the exposed portion of the driving magnet is large, the leakage flux increases thus increasing loss or unnecessary magnetic noise. Alternatively, the influence of FG magnetization can be prevented by attaching the Hall element (position detecting element) so as to float from the surface of the circuit substrate (substrate) by a certain extent, but this may increase the attachment cost and the like of the Hall element (position detecting element).

The third conventional art acts counter to the technically necessary configuration, and thus the FG magnetization becomes impossible to be performed on the end face of the circuit substrate (substrate) side of the magnet (driving magnet) of the rotor.

As shown in FIG. 13, as a solution for the above conventional problem in the brushless motor used as a so-called main motor for simultaneously driving various mechanisms such as a copying machine and a laser beam printer, a technique (hereinafter referred to as fourth conventional art) for preventing the influence on the Hall element (position detecting element) as noise with a configuration in which the rotor magnet 3 is extended toward the circuit substrate (print substrate) 8 side, and the Hall element (position detecting element) 6 is arranged on the circuit substrate (print substrate) 8 so that the direction of magnetic sensitivity is in the radial direction at a position facing the extended portion to greatly reduce the components in the radial direction of the magnetic field (leakage flux) generated by the excitation of the stator coil 4 at the position of the Hall element (position detecting element) 6, is adopted (refer to e.g., JP-U 57-113681 (1982)).

In the fourth conventional art, the rotor magnet 3 is extended toward the circuit substrate (print substrate) 8 side, and thus the gap between the end face of the rotor magnet 3 and the circuit substrate (print substrate) 8 can be reduced. Therefore, by performing FG magnetization on the end face on the circuit substrate (print substrate) 8 side of the rotor magnet 3 and forming the FG pattern on the circuit substrate (print substrate), the magnetic flux from the FG magnet that interlinks with the FG pattern becomes large. That is, the configuration is suitable for incorporating the speed detector of FG pattern system. Further, with regard to the influence of the magnetic field generated by the FG magnet of the rotor magnet (driving magnet) 3, the stable position detection becomes possible since the component in the radial direction at the position of the Hall element (position detecting element) 6 is small.

The brushless motor adopting the fourth conventional art and integrally incorporating the drive/control circuit for rotatably driving and controlling the rotor with the motor is shown in for example, FIG. 14. A configuration (hereinafter referred to as fifth conventional art) for fixing, in addition to the rotor magnet (driving magnet) 3, the FG magnet (speed detecting magnet) 11 on the end face on the side of the circuit substrate 8 of the rotor magnet (driving magnet) 3, or on the upper end face of the driving magnet 3 herein, is proposed (refer to e.g., JP-U 7-9078 (1995)). Reference character 12 is the FG pattern (speed detecting flat coil) and is formed on the lower surface of the circuit substrate 8. The drive/control circuit for rotatably driving and controlling the rotor of a control integrated circuit 13 and the like is mounted on the upper surface of the circuit substrate 8. The speed detecting magnet 11 is a ring-shaped magnet and the N, S magnetic poles of the same number as the number of turns of the FG pattern (speed detecting flat coil) 12 are magnetized alternately along the circumferential direction on the upper end face of the speed detecting magnet 11. The FG pattern (speed detecting flat coil) 12 faces the upper end face of the speed detecting magnet 11. When the speed detecting magnet 11 rotates integral with the rotor yoke 2, the FG pattern (speed detecting flat coil) 12 is induced to the speed detecting magnet 11 to output the speed detecting signal or a signal having a frequency corresponding to the rotating speed of the rotor yoke 2. A space 14 is provided between the control integrated circuit 13 and the upper surface of the circuit substrate 8, and electronic chip components 15 are arranged in the space 14.

The Hall element 6 is arranged at the bottom surface side of the circuit substrate 8, and a plurality of them are arranged at a position close to the FG pattern (speed detecting flat coil) 12. Reference character 16 is a motor attachment plate having an area substantially covering the entire upper surface of the motor, and is arranged near the circuit substrate 8 so that the bottom surface contacts the upper surface of the control integrated circuit 13.

The control integrated circuit 13, the electronic chip components 15 and the like are arranged on the upper surface of the circuit substrate 8, as mentioned above. On the lower surface of the circuit substrate 8, the FG pattern (speed detecting flat coil) 12, a circuit pattern and the like is printed, and the Hall element 6 and the like is arranged, as mentioned above. An outer lead 17 of the control integrated circuit 13 is projected out toward the lower surface of the circuit substrate 8.

In the configuration of the fifth conventional art, although the chip components 15 are mounted between the control integrated circuit 13 and the circuit substrate 8 to reduce the outer diameter of the motor (circuit substrate), a gap must be formed between the control integrated circuit 13 and the chip components 15 and thus the motor is prevented from being thin.

The speed detector of FG pattern system has the FG pattern (speed detecting flat coil) 12 arranged so as to surround the vicinity of the stator core 5, and thus the noise generated from the stator coil 4 is easily picked up. Thus, a so-called cancel pattern for canceling the components produced by such noise must be arranged in parallel with the outer peripheral side or the inner peripheral side of the FG pattern (speed detecting flat coil) 12.

Particularly, as the PWM driving method is generally adopted to enhance the power supply efficiency of the motor in the above mentioned main motor, the noise level generated from the stator coil 4 becomes very large. Further, in the conventional brushless motor for the main motor, the driving method of supplying the drive current that generates the magnetic field, which has the waveform of FIG. 11B (FIG. 9B of JP-A 7-327351 (1995)) showing the third conventional art, from the stator core to the stator coil (winding wire) 4 is adopted, and thus a rapid magnetic field change occurs and becomes the cause of influence on the FG pattern. The cancel pattern for the noise is thus essential.

Generally, the speed detector of FG pattern system reduces the influence of run-out and the like of the rotor part (FG magnet) during rotation or eccentricity of the FG magnet of the rotor part, and thus the length in the radial direction of the generator wire elements of the FG pattern must be longer than the length in the radial direction of the FG magnet.

When reducing the outer diameter of the motor while satisfying the above essential conditions, in the configuration of the fifth conventional art, the Hall element 6 is arranged on the same side as the FG pattern 12 of the circuit substrate 8, and in order to secure the length of the generator wire elements of the FG pattern with the inner peripheral diameter of the FG pattern 12 or the inner peripheral diameter of the cancel pattern being a diameter sufficiently smaller than the inner peripheral diameter of the FG magnet 11, the installing position of the Hall element 6 must be moved toward the shaft center of the motor. The distance between the rotor magnet 3 and the Hall element 6 thus increases and a sufficient position detection signal is not obtained. In order to reduce the distance between the rotor magnet 3 and the Hall element 6, the FG pattern 12 and the cancel pattern 18 around the Hall element 6 must have a configuration so as to narrow the width, as shown in FIG. 15, or to circumvent toward the outer side of the shaft center of the motor. In this case, the length of the generator wire elements becomes uneven, and worsens the speed detecting precision.

SUMMARY OF THE INVENTION

The invention has been accomplished in order to solve the conventional problems, and it is therefore an object of the invention to provide a brushless motor integrally incorporating a drive/control circuit and a motor, that is thinner, smaller, that saves as much space as possible, and that has high output.

In order to achieve the aforementioned object, the invention provides a brushless motor provided with a circuit integrated core with an FG pattern formed uniformly along the entire circumference by including a pattern system FG, and arranging a Hall element on a surface of a circuit substrate opposite to the surface formed with the FG pattern and a noise cancel pattern.

According to a first aspect of the invention, there is provided a brushless motor comprising: a stator core around which a stator coil is wound; a rotor including a cup-shaped rotor yoke attached on the inner peripheral side with a ring-shaped magnet being arranged to face the stator core and having magnetized a plurality of poles for driving along a circumferential direction on the inner periphery, and a shaft fixed at the center of the rotor yoke; a bearing for journaling the shaft in a freely rotating manner; a housing for holding the bearing on the inner peripheral side and holding the stator core on the outer peripheral side; a Hall element for detecting a position in a rotating direction of the magnet of the rotor; a speed detector for detecting the rotating speed of the rotor; and a circuit substrate fixed to the housing and equipped with a drive/control circuit for rotatably driving and controlling the rotor. Herein, the speed detector includes: a plurality of magnetized portions located at an end face of the magnet along a circumferential direction of the magnet on the open end side of the rotor; a speed detecting pattern including a plurality of generator wire elements connected circularly in series to be uniform along the entire circumference of the circuit substrate, at a position corresponding to the magnetized portions and on the side facing the end face of the magnet of the rotor, the generator wire elements being the same in number as poles of the magnetized portions arranged on the circuit substrate; and a cancel pattern arranged at the external side or the internal side of the speed detecting pattern so as to surround the speed detecting pattern, the cancel pattern being connected in series with the speed detecting pattern. The Hall element is arranged on a surface of the circuit substrate on the opposite side to the surface provided with the speed detector.

According to a second aspect of the invention, in the brushless motor according to the first aspect, the drive/control circuit includes: a connector for power supply from an external part of the motor; a capacitor connected between positive-negative line of power supply; a current detecting resistor for detecting the amount of current supplied to the stator coil; a drive/control integrated circuit; and electronic components for surface mounting. The drive/control integrated circuit, the electronic components for surface mounting and the Hall element are all surface mounted by soldering on a surface of the circuit substrate on the side opposite to the surface provided with the speed detecting pattern and the cancel pattern.

According to a third aspect of the invention, in the brushless motor according to the first aspect, the drive/control circuit is configured to supply a current of a substantially sinusoidal shape to the stator coil.

According to a fourth aspect of the invention, in the brushless motor according to the second aspect, the drive/control circuit is configured to supply a current of a substantially sinusoidal shape to the stator coil.

According to a fifth aspect of the invention, in the brushless motor according to the first aspect, an attachment part to an apparatus to be equipped with the motor is formed on the housing.

According to a sixth aspect of the invention, in the brushless motor according to the second aspect, an attachment part to an apparatus to be equipped with the motor is formed on the housing.

According to a seventh aspect of the invention, in the brushless motor according to the third aspect, an attachment part to an apparatus to be equipped with the motor is formed on the housing.

According to an eighth aspect of the invention, in the brushless motor according to the fourth aspect, an attachment part to an apparatus to be equipped with the motor is formed on the housing.

According to a ninth aspect of the invention, in the brushless motor according to the second aspect, the drive/control integrated circuit, the electronic components for surface mounting and the Hall element are arranged within a projection range of an outer diameter of the rotor yoke of the circuit substrate.

According to a tenth aspect of the invention, in the brushless motor according to any one of the first to ninth aspects, the magnet of the rotor is a rare earth isotropic resin magnet.

According to an eleventh aspect of the invention, a brushless motor comprises: a stator core around which a stator coil is wound; a rotor including a cup-shaped rotor yoke attached on the inner peripheral side with a ring-shaped magnet being arranged to face the stator core and having magnetized a plurality of poles for driving along a circumferential direction on the inner periphery, and a shaft fixed at the center of the rotor yoke; a bearing for journaling the shaft in a freely rotating manner; a housing for holding the bearing on the inner peripheral side and holding the stator core on the outer peripheral side; a Hall element for detecting a position in a rotating direction of the magnet of the rotor; a speed detector for detecting the rotating speed of the rotor; and a circuit substrate fixed to the housing and equipped with a drive/control circuit for rotatably driving and controlling the rotor. Herein, the speed detector includes: a plurality of magnetized portions located at an end face of the magnet along a circumferential direction of the magnet on an open end side of the rotor; a speed detecting pattern comprising a plurality of generator wire elements connected circularly in series along the entire circumference of the circuit substrate, at a position corresponding to the magnetized portions and on the side facing the end face of the magnet of the rotor, so that a length in a radial direction of each generator wire element is equal to or greater than a length in a radial direction of the magnetized portion, the generator wire elements being the same in number as poles of the magnetized portions located on the circuit substrate; and a cancel pattern located at the external side or the internal side of the speed detecting pattern so as to surround the speed detecting pattern, the cancel patter being connected in series with the speed detecting pattern. Herein, the Hall element is located on a surface of the circuit substrate on the side opposite to the surface located mounted with the speed detector.

With the configurations according to the first and eleventh aspects of the invention, the interference between the Hall element and the speed detecting pattern or the cancel pattern is eliminated even when the outer diameter of the circuit substrate is reduced. Thus the speed detecting pattern and the cancel pattern can be located uniformly along the entire circumference of the circuit substrate and the Hall element is arranged spaced away from the magnetized portions of the speed detector, thus reducing the influence. Therefore, such effects or advantages are obtained that the provided drive/control circuit integrated brushless motor has high rotating precision and a satisfactory noise resistance, besides being suited to be smaller, to save as much space as possible, and to have high output.

With the configuration according to the second aspect of the invention, such effects or advantages are obtained that the overall height dimension of the motor is reduced and the time necessary to mount components is greatly reduced.

With the configurations according to the third and fourth aspects of the invention, a rapid change in current to be fed to the stator coil is reduced and the rapid change in magnetic field generated from the stator coil can be reduced, so that the influence can be reduced not only on the speed detecting pattern but also on the Hall element. Therefore, more accurate position detection becomes possible, and such effect or advantage is obtained that the provided brushless motor has higher rotating precision and noise resistance.

With the configurations according to the fifth to eighth aspects of the invention, the number of components of the motor can be reduced, and thus in addition to the above effects or advantages, such effect or advantage is obtained that the brushless motor has a height dimension which is further reduced, and that the number of assembly processes is reduced.

With the configuration according to the ninth aspect of the invention, the drive/control integrated circuit and the peripheral circuit are mounted on the inner side of the rotor yoke, thereby preventing malfunction of the drive/control circuit of the motor caused by radiation electric field noise of the apparatus mounted with the motor. Therefore, in addition to the above effects and advantages, such effect or advantage is obtained that the brushless motor has a satisfactory noise resistance.

With the configuration according to the tenth aspect of the invention, such effects or advantages are obtained that the magnetic flux density of the magnetized poles for driving of the magnet is increased so that high-efficiency high torque can be realized, that the magnetic flux toward the Hall element is also increased so that accurate position detection can be performed, and that the magnetization toward the end face of the magnet is facilitated because of the isotropic configuration.

DESCRIPTION OF THE PREFERRED EMBODIMENTS

Preferred embodiments of the invention will now be described with reference to the drawings.

FIRST EMBODIMENT

Figure 1:
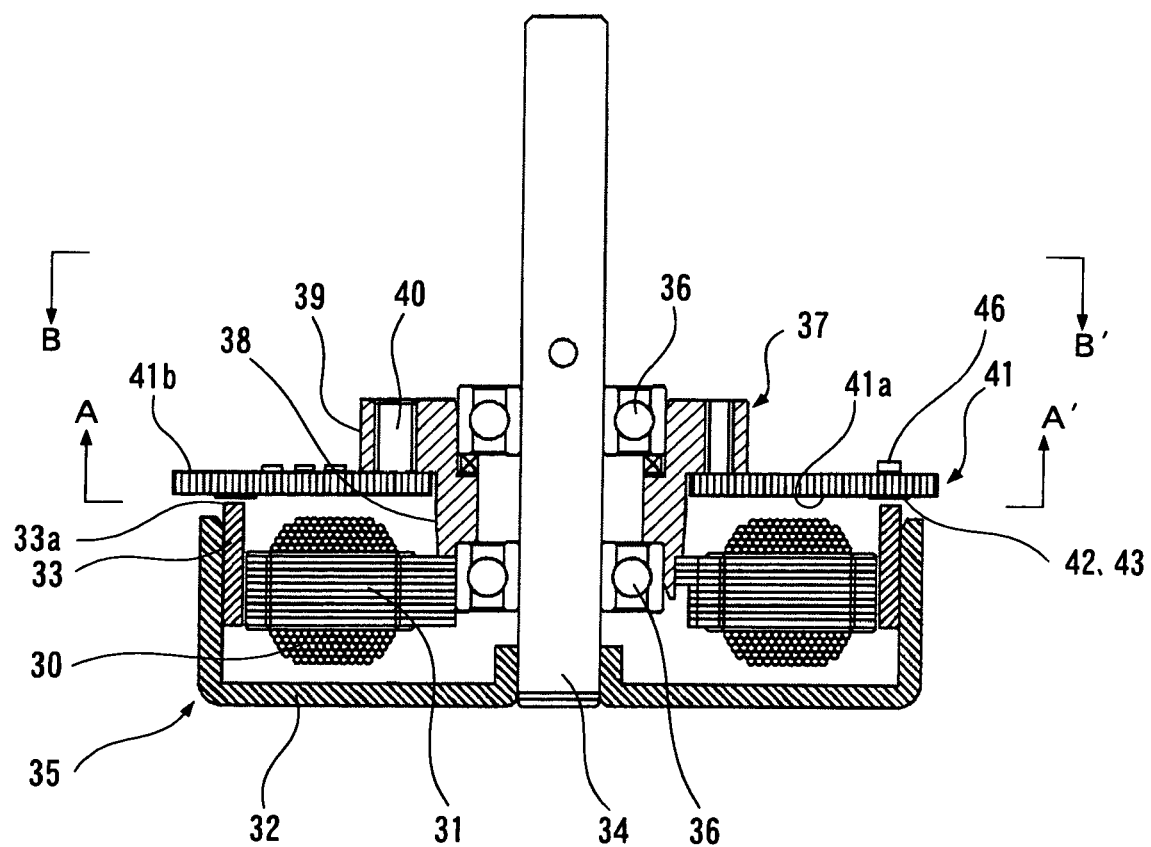
FIG. 1 is a cross sectional view of a first embodiment of the invention.
Figure 2:
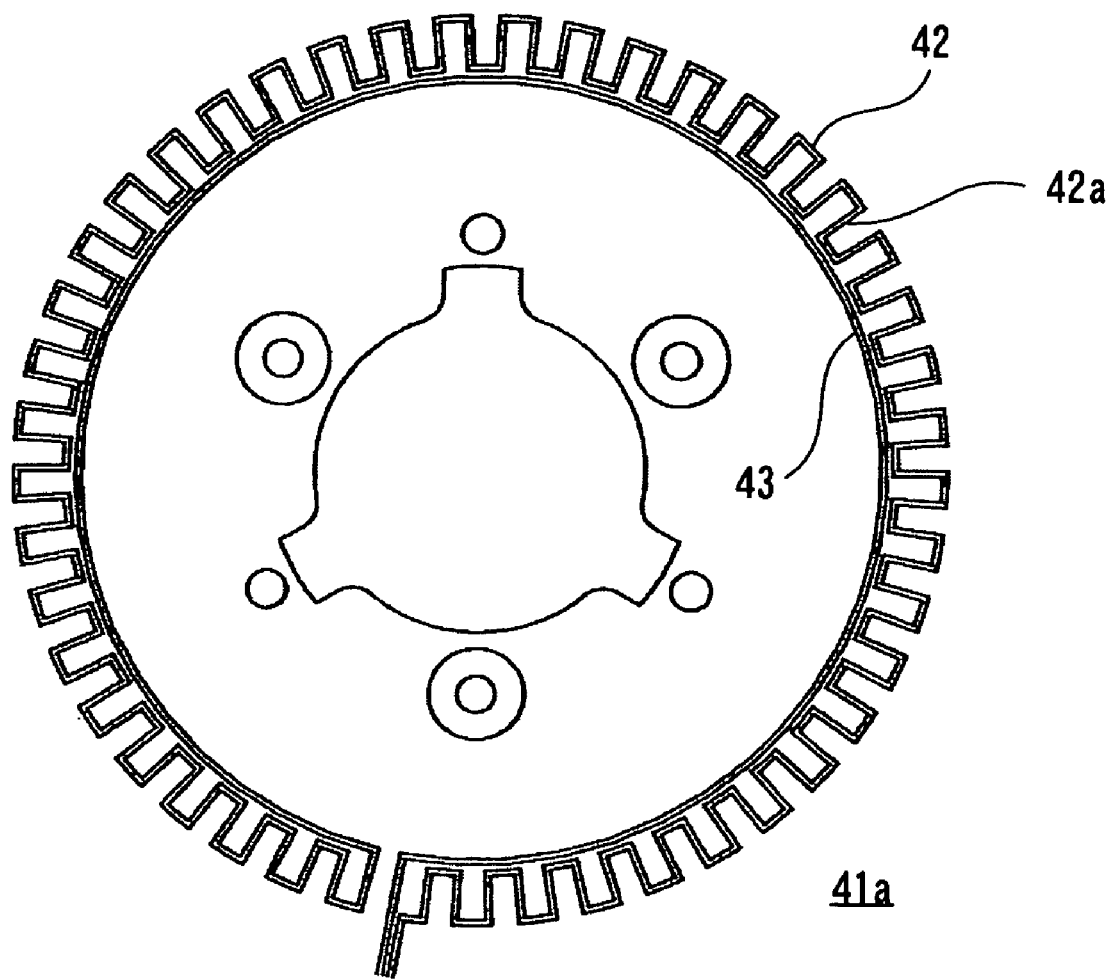
FIG. 2 is a view taken along line A-A' in the first embodiment.
Figure 3:
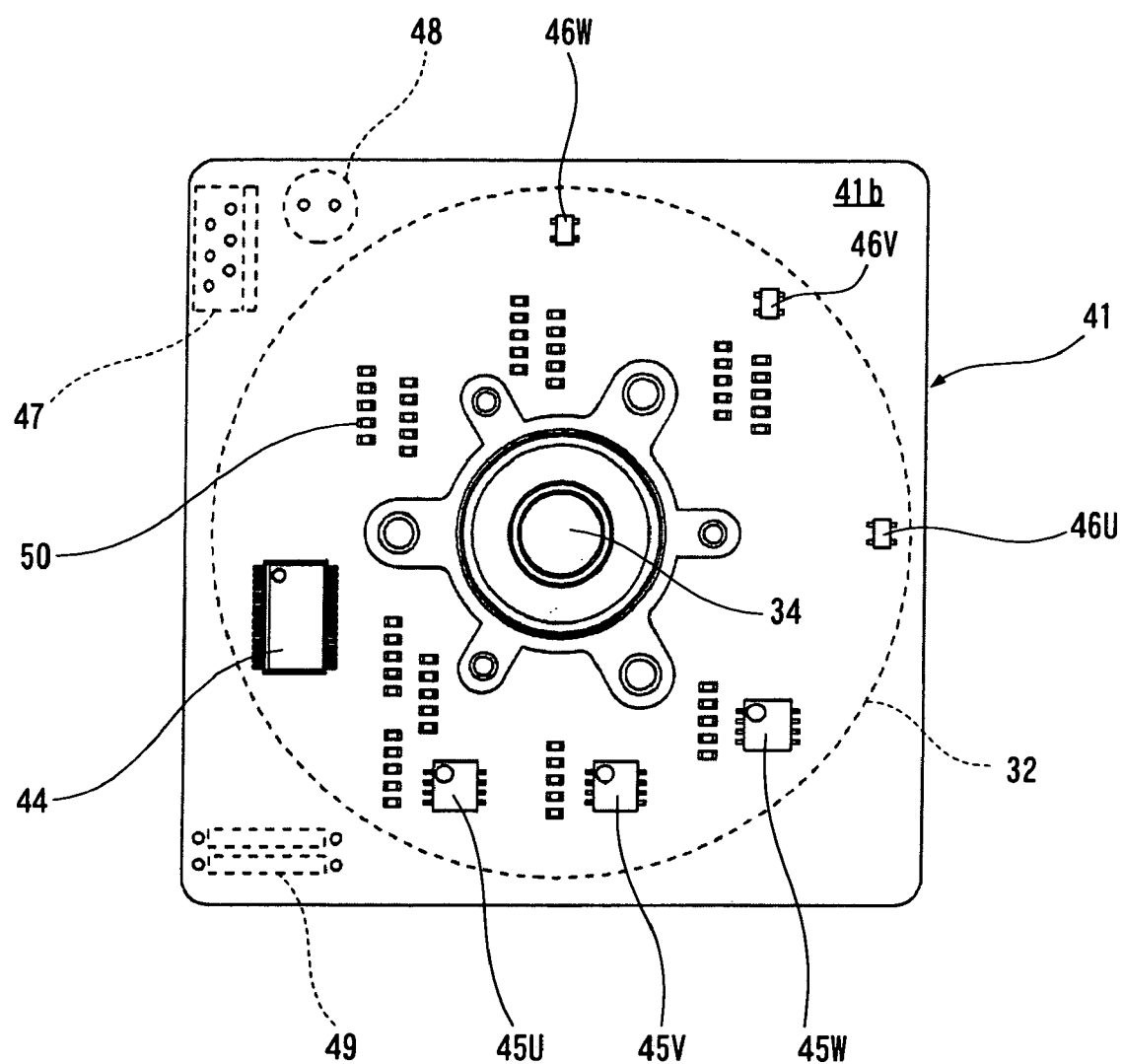
FIG. 3 is a view taken along line B-B' in the first embodiment.

FIGS. 1 to 3 show a brushless motor according to a first embodiment of the invention.

In FIG. 1, reference character 30 refers to a stator coil, and is wound around each salient pole of a stator core 31. Reference character 32 refers to a rotor yoke made of magnetic material, and a rotor 35 is formed by a rotor magnet 33 attached to the inner periphery of the rotor yoke 32 and a shaft 34 fixed at the center. Reference character 36 refers to a bearing for journaling the shaft 34 of the rotor 35. Reference character 37 refers to a housing including a cylinder 38 and a flange 39, where the bearing 36 is supported at the inner periphery of the cylinder 38 of the housing 37, and the stator core 31 is fixed on the outer periphery of the cylinder 38 of the housing 37.

In this embodiment, the flange 39 of the housing 37 acts as an attachment surface to an apparatus to be equipped with the motor, and an attachment screw hole 40 is formed therein as necessary.

A plurality of magnetized poles for driving is applied in the radial direction on the inner peripheral surface of the rotor magnet 33. An FG magnet part 33a is formed on the end face of an open end of the rotor magnet 33. The FG magnet part 33a has a plurality of N, S magnetic poles alternately magnetized in a direction orthogonal to the driving magnet of the inner peripheral surface of the rotor magnet 33 along the circumferential direction, and the number of the N, S magnetic poles is larger than the number of the magnetic poles of the driving magnet to enhance the resolution of the speed detection.

An FG pattern (speed detecting pattern) 42 and a cancel pattern 43 are formed in a circular shape, as shown in FIG. 2, on one surface 41a of the circuit substrate 41 attached to the flange 39 of the housing 37 so as to face the FG magnet part 33a of the end face of the rotor magnet 33. More specifically, the FG pattern is formed so that the length in the radial direction of each generator wire element 42a is equal to or greater than the length of the radial direction of the FG magnet part 33a.

A drive/control integrated circuit of a drive/control circuit part and Hall elements 46U, 46V, 46W and chip-type electronic components (resistor, capacitor) 50 are surface mounted through soldering on the other surface 41b of the circuit substrate 41. The integrated circuit is configured in a distributed manner into a pre-drive/control integrated circuit 44, and a plurality of packages of a first power MOS array 45U for turning on/off the current feed to the stator coil of U phase, a second power MOS array 45V for turning on/off the current feed to the stator coil of V phase, and a third power MOS array 45W for turning on/off the current feed to the stator coil of W phase. The pre-drive/control integrated circuit 44 and electronic components such as the first to the third power MOS arrays 45U, 45V, 45W, Hall elements 46U, 46V, 46W, and chip type electronic components (resistor, capacitor) 50 are arranged in the projection range of the outer diameter of the rotor yoke 32 in which a shield effect by the rotor yoke 32 is expected.

The speed detecting FG pattern 42 of the rotor 35 is formed into a circular shape so that the generator wire elements 42a of the number same as the number of magnetized poles of the FG magnet part 33a face the FG magnet part 33a of the end face of the rotor magnet 33, and each generator wire element 42a is connected in series. When the FG magnet part 33a rotates integrally with the rotor 35, the speed detection signal of a frequency corresponding to the rotating speed of the rotor 35 is induced by the relative magnetic flux change with the FG magnet part 33a at the FG pattern 42.

The cancel pattern 43 is arranged on the inner side of the FG pattern 42 to surround the FG pattern 42, and is formed so as to be connected in series with the FG pattern 42 so that the noise components superimposed on the speed detecting signal by the noise and the like generated by exciting the stator coil 30 and the noise generated at the cancel pattern 43 have reversed phases.

In this embodiment, the cancel pattern 43 is arranged on the inner side of the FG pattern 42 in order to reduce the outside dimension of the circuit substrate 41 as much as possible, but the cancel pattern 43 may be arranged on the outer side depending on the outside dimension of the circuit substrate 41.

The FG pattern 42 and the cancel pattern 43 are thus printed on the surface 41a opposite to the surface 41b of the circuit substrate 41 arranged with the drive/control integrated circuit 44 and power MOS arrays 45, the Hall elements 46 and the like.

Only the components having a lead or a terminal such as a connector 47 for power supply from the external part of the motor, a capacitor 48 connected between the positive-negative line of the power supply, and a current detecting resistor 49 for detecting the amount of current supplied to the stator coil 30 are arranged on one surface 41a of the circuit substrate 41, and the lead or the terminal are projected outward and attached on the opposite surface 41b side of the circuit substrate 41. All the soldering land for mounting the lead components and the terminal components is arranged on the surface 41b opposite to the FG pattern 42.

Consequently, even if the outer diameter of the circuit substrate 41 is made small, the interference between the Hall element 46 and the FG pattern 42 or the cancel pattern 43 is eliminated, and thus an even FG pattern 42 as well as cancel pattern 43 is formed across the entire circumference in a circular shape. Further, the Hall element 46 is arranged spaced apart from the FG magnet part 33a, thereby reducing influence and high rotating precision and satisfactory noise resistance can be simultaneously achieved.

The components having lead or terminal such as the connector 47, the capacitor 48 connected between the positive-negative line of the power supply, and the current detecting resistor 49 are inserted from the side of the surface 41a formed with the FG pattern 42 and the cancel pattern 43 through a hole perforated in the circuit substrate 41 in correspondence to the lead or the terminal, and then electrically connected by soldering at the soldering land formed around the component inserting hole of the surface 41b opposite to the surface 41a of the circuit substrate 41, and thus are simultaneously soldered with the drive/control integrated circuit 44 or electronic components 45 and Hall element 46 that are surface mounted or all remaining component to be mounted on the same surface as the soldering land. The man hour can be thus greatly reduced. Since the components having large height dimension such as the connector 47 and the capacitor 48 are arranged on the same side as the rotor 35, a configuration in which the overall height dimension of the motor is not affected with the height of the components within the range of the height dimension of the rotor 35 is easily achieved. Further, as the lead or the terminal parts projecting out toward the side of the stator coil 30 does not exist, the spacing between the stator coil 30 and the circuit substrate 41 does not need to be increased, and the height of the component mounting surface can be reduced, and thus the overall height dimension of the motor can be reduced.

Accordingly, the effect or advantage of providing a drive/control circuit integrated brushless motor that is suited to be smaller, to save as much space as possible, and to have high output can be exhibited.

Therefore, when a so-called pseudo-sinusoidal driving method for supplying the current of substantially sinusoidal shape to the stator coil is adopted for the drive/control integrated circuit 44, a rapid change in the current to be fed to the stator coil 30 is reduced, and the rapid change in the magnetic field generated from the stator core 31 can be reduced. The influence on not only the FG pattern 42 but also on the Hall element 46 can be thereby reduced. Therefore, the detection of an accurate position becomes possible, and the worsening of torque fluctuation can be prevented. A brushless motor having a higher rotating precision and a satisfactory noise resistance can be thereby realized.

The flange 39 can be used as an attachment part to the apparatus equipped with the motor by forming a hole 40 in the flange 39 of the housing 37, as shown in FIG. 1.

According to this configuration, an effect or advantage of providing a brushless motor that does not require a separate attachment member thus reducing the number of components of the motor, and in which the height dimension of the motor is reduced and the assembly man hour is reduced is obtained.

If the rotor magnet 33 is formed with an isotropic rare earth resin magnet such as neodybond magnet, the magnetic flux density of the driving magnet of the inner periphery can be increased, and thus an efficient high torque can be achieved. Further, as the magnetic flux to the Hall element 46 is increased, a position detection of higher precision becomes possible, and the magnetization to the end face 33a of the rotor magnet 33 is facilitated due to isotropy. A more stable and high precision speed detection signal can be thus obtained.

SECOND EMBODIMENT

Figure 4:
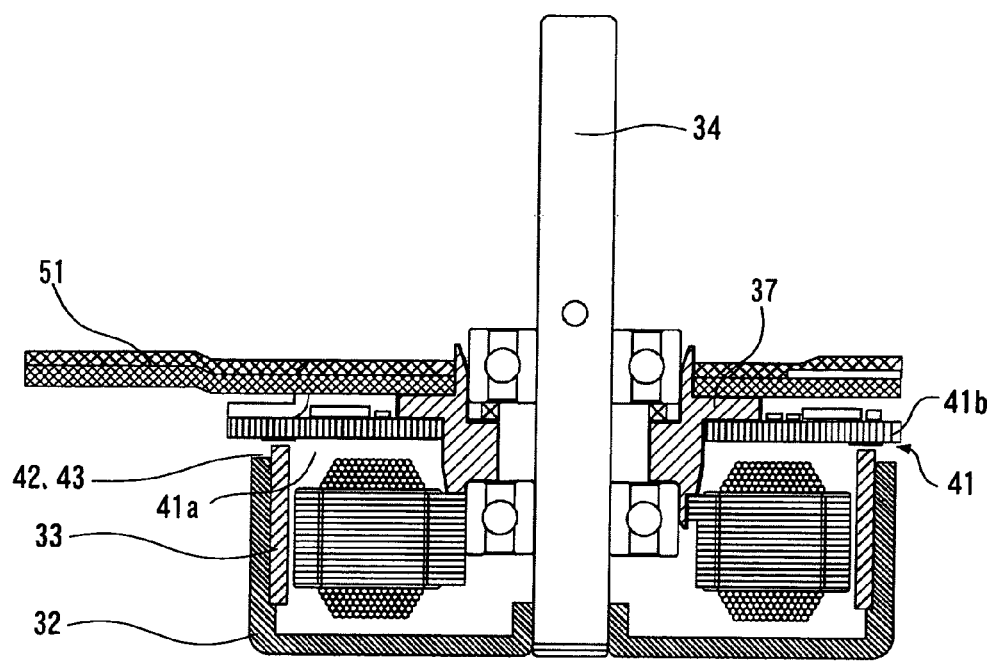
FIG. 4 is a cross sectional view of a second embodiment of the invention.
Figure 5:
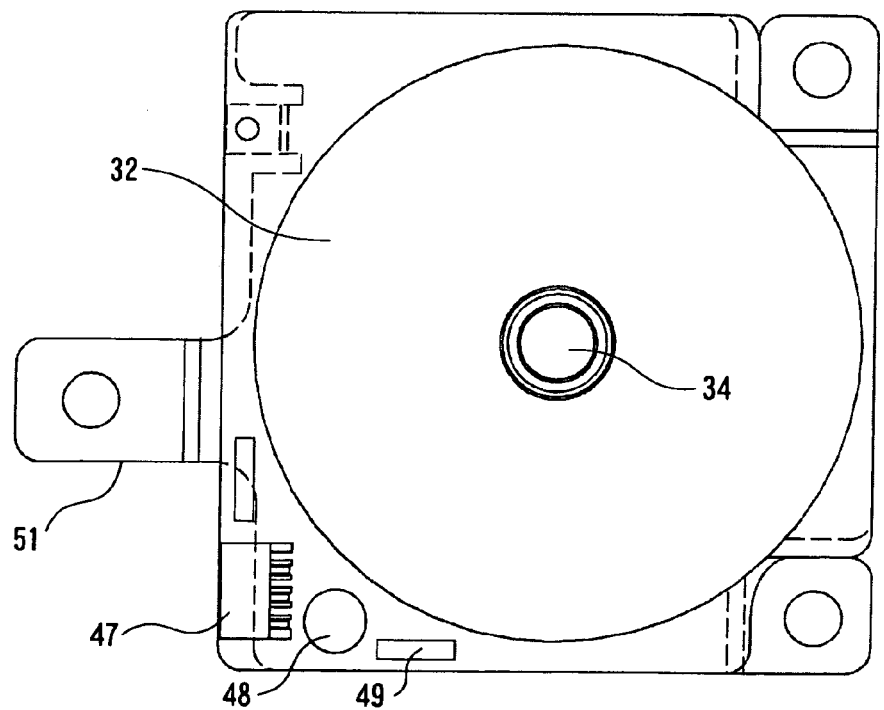
FIG. 5 is a bottom view of the second embodiment.
Figure 6:
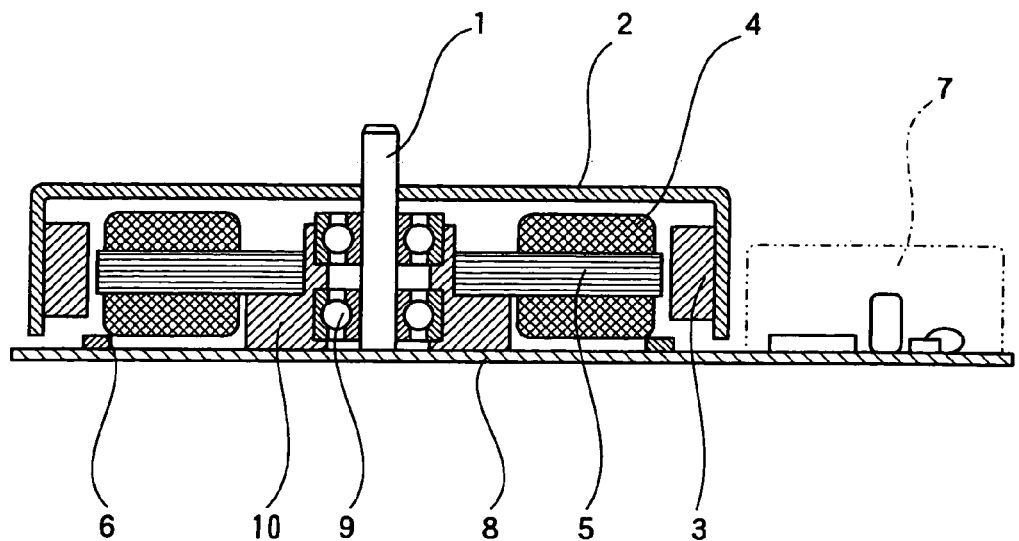
FIG. 6 is a cross sectional view of a brushless motor according to a first conventional art.
Figure 7:
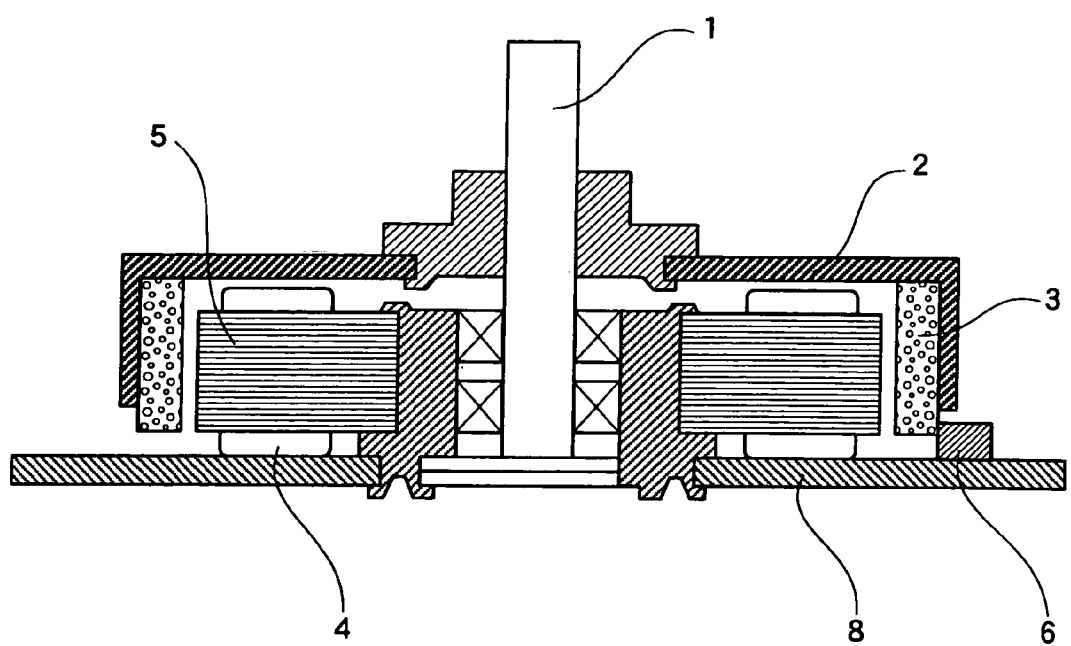
FIG. 7 is a cross sectional view of a brushless motor according to a second conventional art.
Figure 8:
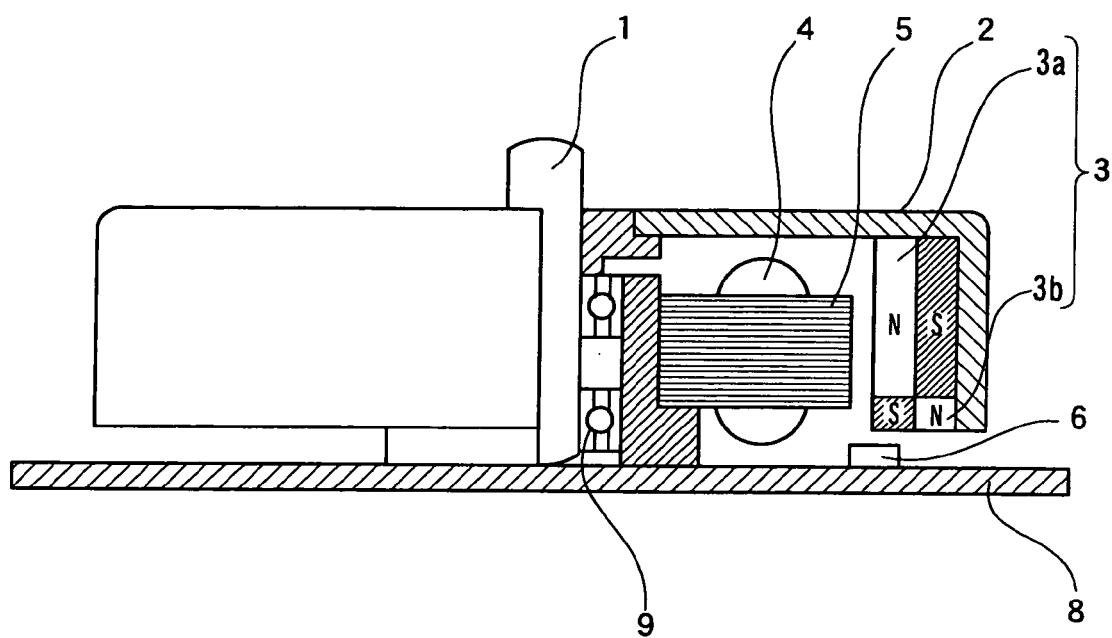
FIG. 8 is a cross sectional view of a brushless motor according to a third conventional art.
Figure 9:
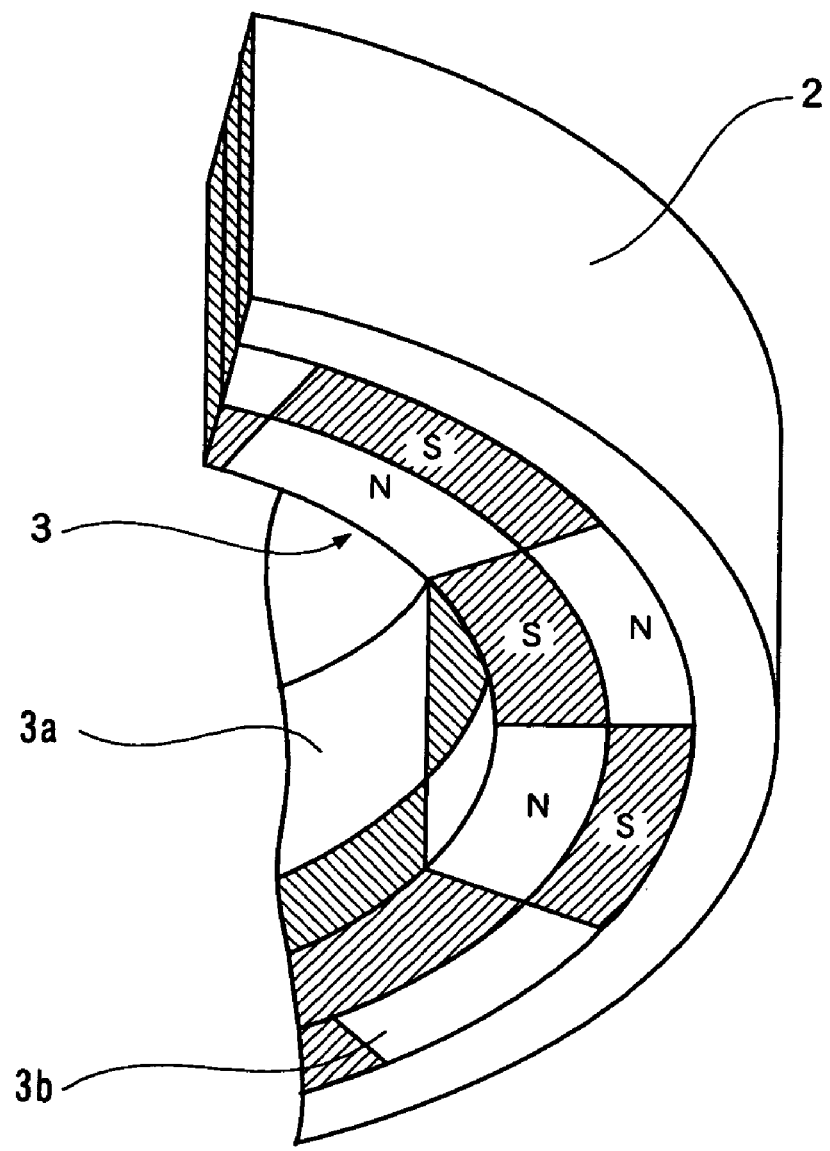
FIG. 9 is an enlarged perspective view of a main part of the third conventional art.
Figure 10:
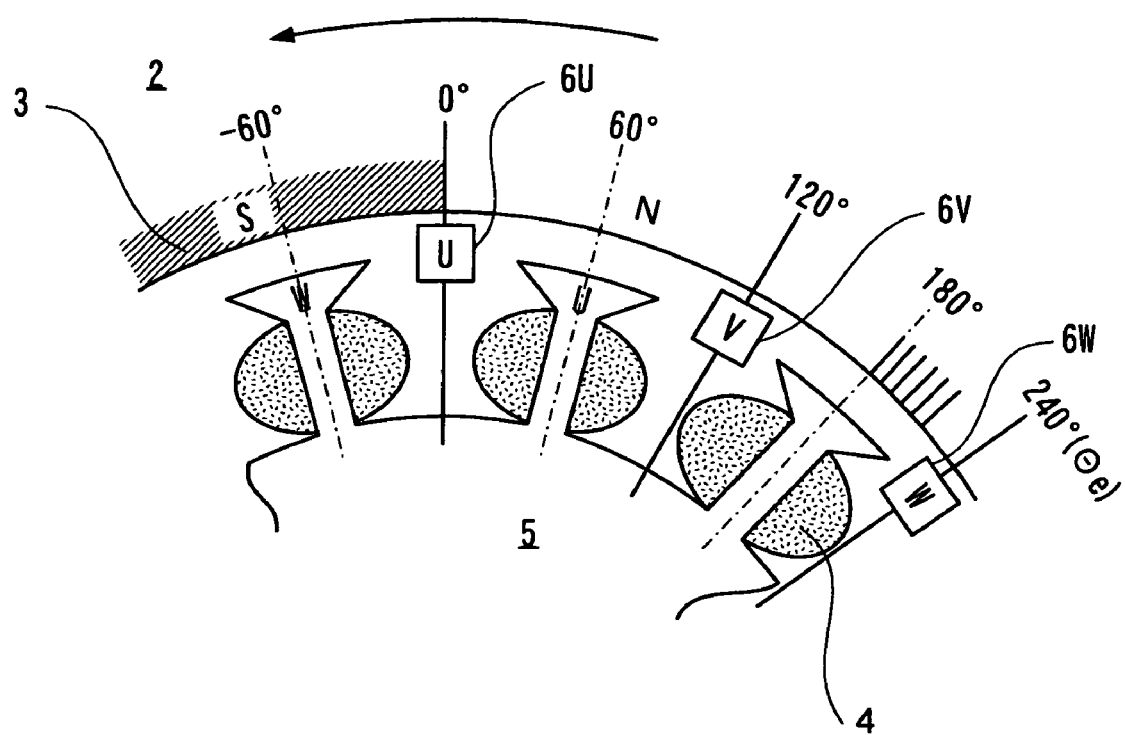
FIG. 10 is a planar arrangement of the main part of the third conventional art.
Figure 11A:
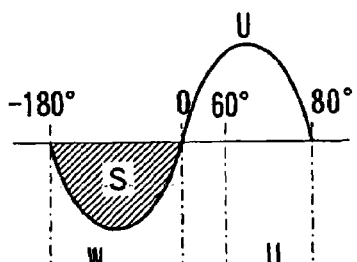
FIGS. 11A to 11G are waveform charts each of the main part of the third conventional art.
Figure 11B:
Figure 11C:
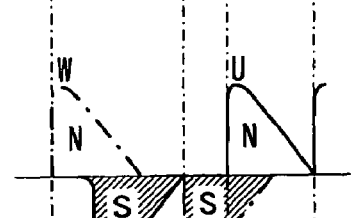
Figure 11D:
Figure 11E:
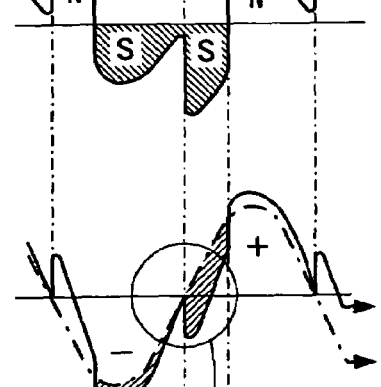
Figure 11F:
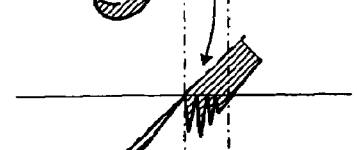
Figure 11G:
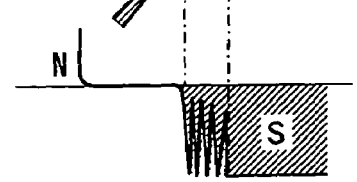
Figure 12A:
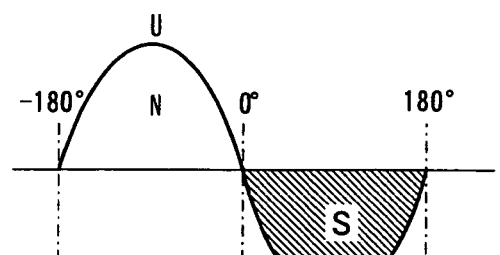
FIGS. 12A to 12E are waveform charts each of the main part of the third conventional art.
Figure 12B:
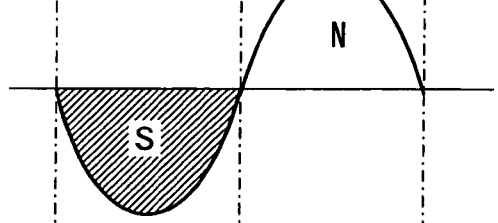
Figure 12C:
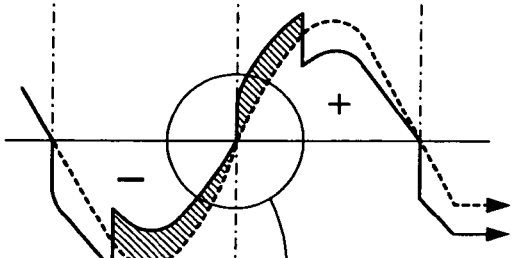
Figure 12D:
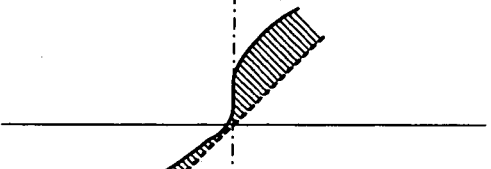
Figure 12E:
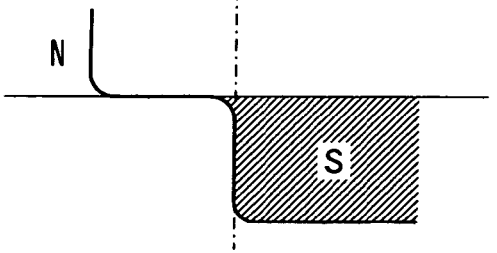
Figure 13:
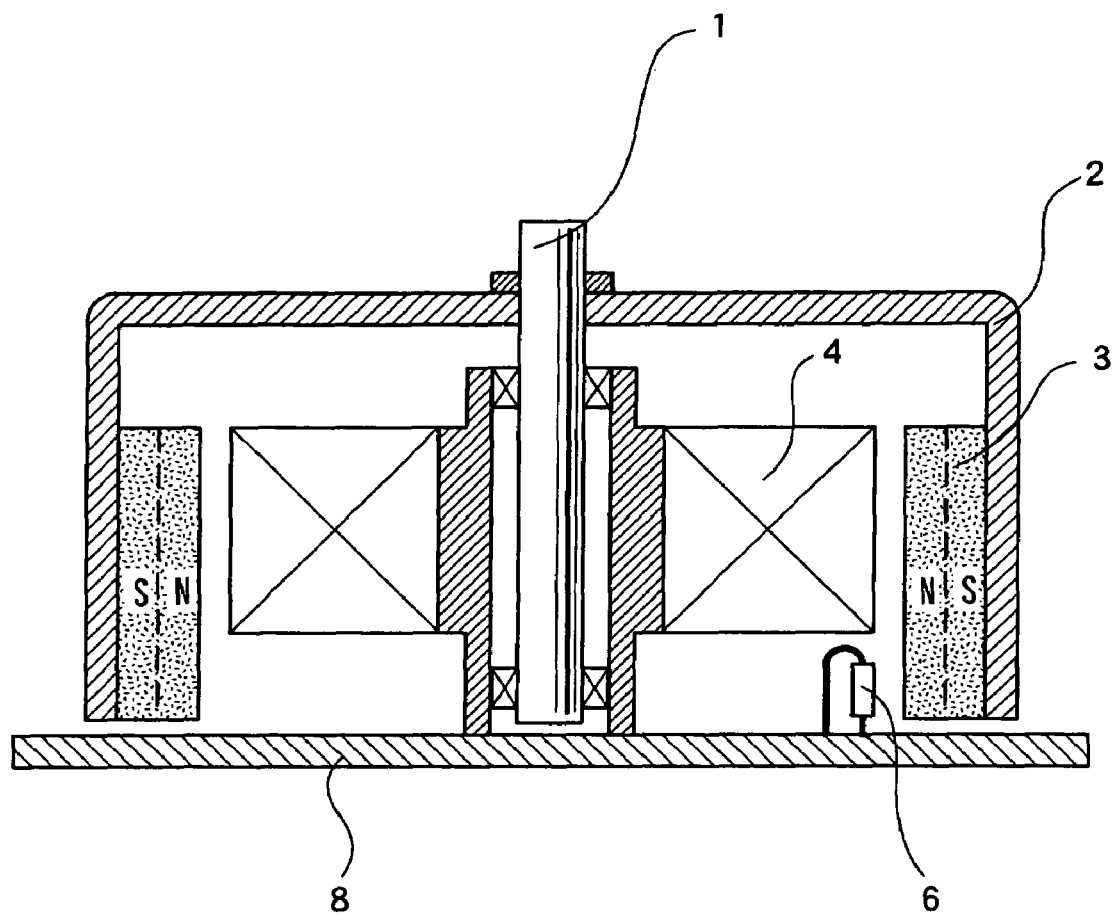
FIG. 13 is a cross sectional view of a brushless motor according to a fourth conventional art.
Figure 14:
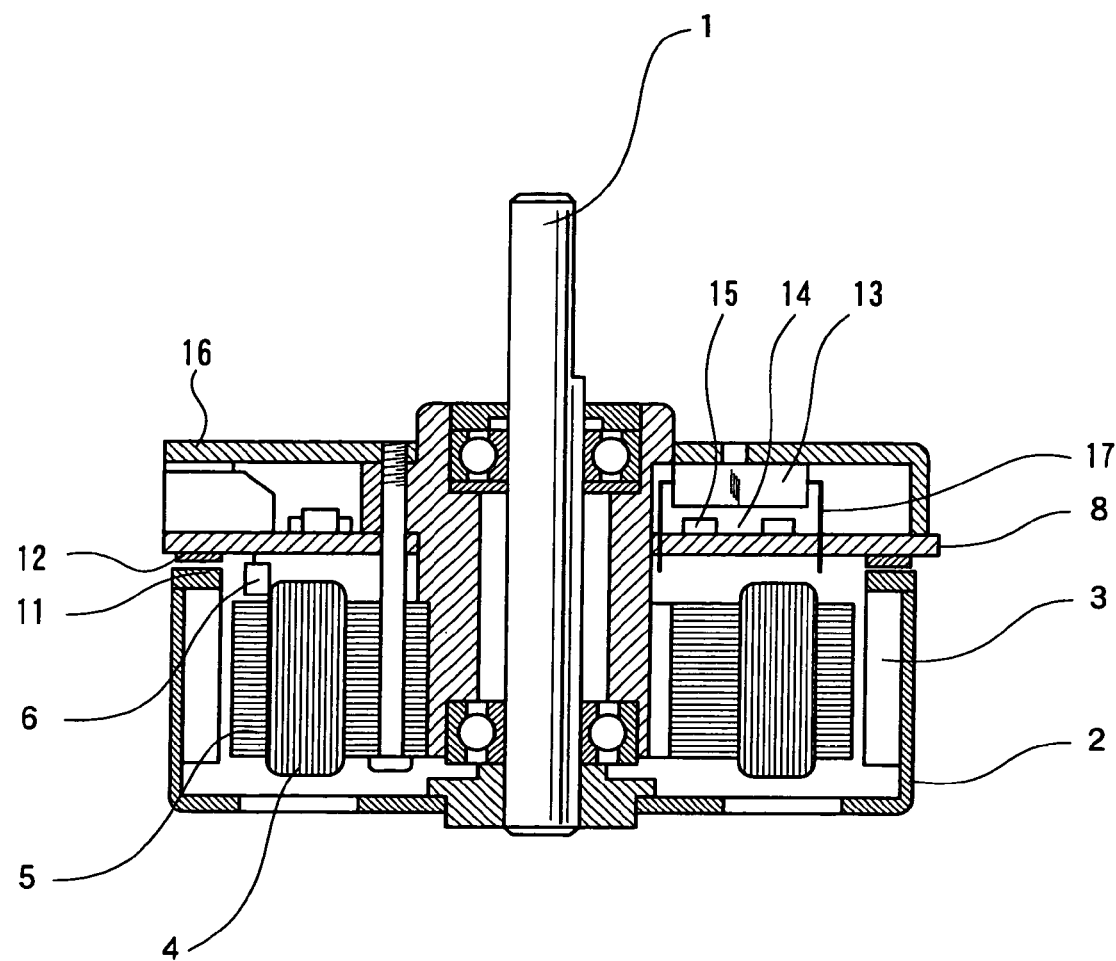
FIG. 14 is a cross sectional view of a brushless motor according to a fifth conventional art.
Figure 15:
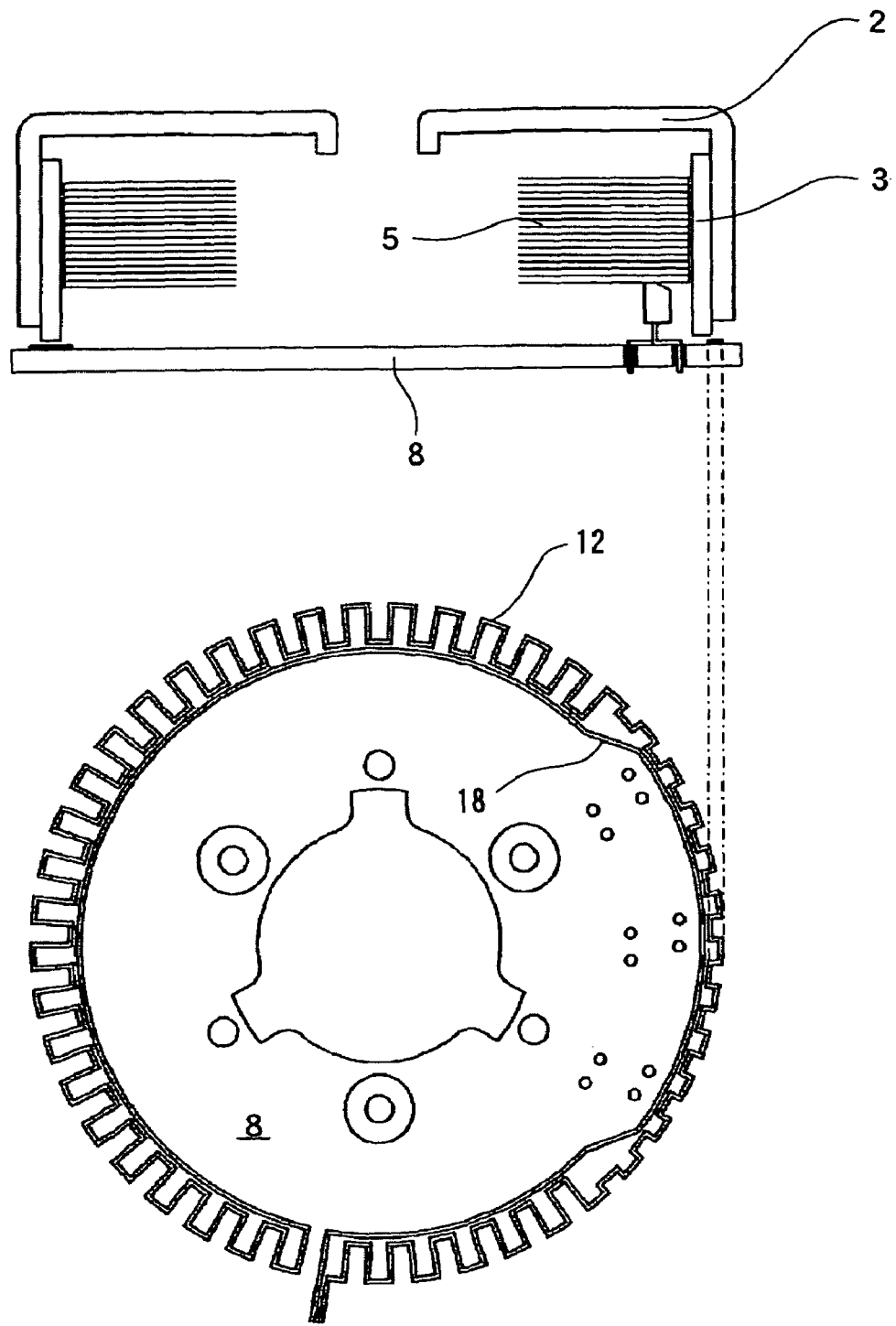
FIG. 15 is a plan view of a main part of the fifth conventional art.
Figure 16:
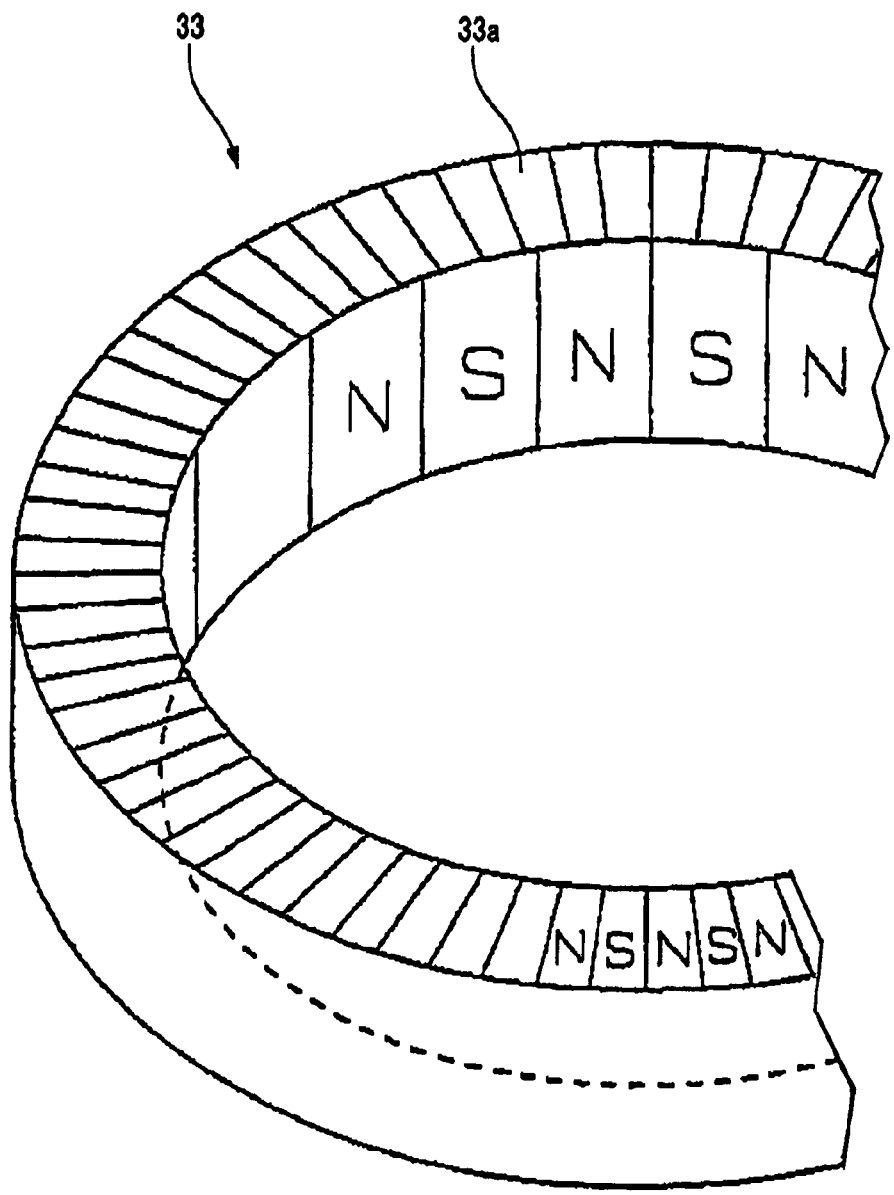
FIG. 16 is a circumferential view of the magnet according to the first embodiment of the invention.

FIGS. 4 and 5 show a second embodiment of the invention.

In the first embodiment, the Hall element is arranged on the surface opposite to the surface formed with the FG pattern and the noise cancel pattern of the circuit substrate, thereby arranging the pre-drive/control integrated circuit 44 and the electronic components such as the first to third power MOS arrays 45U, 45V, 45W, the Hall elements 46U, 46V, 46W, and the chip type electronic components (resistor, capacitor) within the projection range of the rotor yoke 32 in which a shield effect is expected by the rotor yoke 32. In the case of the second embodiment shown in FIGS. 4 and 5, however, an attachment plate 51 made of a magnetic material is arranged on the flange 39 of the housing 37, thus preventing malfunction of the drive/control circuit of the motor caused by the radiation electric field noise of the apparatus equipped with the motor by the shield effect of the attachment plate 51 even if the electronic components are arranged across the external side of the projection range of the outer diameter of the rotor yoke 32 of the circuit substrate 41. A brushless motor excelling in noise resistance can be thus achieved. Other configurations are the same as the first embodiment.

The spindle motor of such configuration is attached to the apparatus equipped with the motor by way of the attachment plate 51.

The brushless motor of the invention is useful as a main motor for simultaneously driving various mechanisms such as a copying machine and a laser beam printer.

What is claimed is:

1. A brushless motor comprising:
    a stator core being wound therearound with a stator coil;
    a rotor including a cup-shaped rotor yoke attached on the inner peripheral side with a ring-shaped magnet being arranged to face the stator core and having magnetized a plurality of poles for driving along a circumferential direction on the inner periphery, and a shaft fixed at the center of the rotor yoke;
    a bearing for journaling the shaft in a freely rotating manner;
    a housing for holding the bearing on the inner peripheral side and holding the stator core on the outer peripheral side;
    a Hall element for detecting a position in a rotating direction of the magnet of the rotor;
    a speed detector for detecting the rotating speed of the rotor; and
    a circuit substrate fixed to the housing and equipped with a drive/control circuit for rotatably driving and controlling the rotor, wherein
    the speed detector comprises:
    a plurality of magnetized portions located at an end face of the magnet along a circumferential direction thereof on an open end side of the rotor;
    a speed detecting pattern comprising a plurality of generator wire elements connected circularly in series to be uniform along the entire circumference of the circuit substrate, at a position corresponding to the magnetized portions and on the side facing the end face of the magnet of the rotor, the generator wire elements being the same in number as poles of the magnetized portions located on the circuit substrate; and
    a cancel pattern located at one of the external side and the internal side of the speed detecting pattern so as to surround the speed detecting pattern, the cancel pattern being connected in series with the speed detecting pattern,
    the Hall element being located on a surface of the circuit substrate on the opposite side to the surface located with the speed detector, and
    the drive/control circuit comprises:
        a drive/control integrated circuit; and
        electronic components for surface mounting,
        the drive/control integrated circuit, the electronic components for surface mounting and the Hall element being all surface mounted by soldering on a surface of the circuit substrate on the side opposite to the surface located with the speed detecting pattern and the cancel pattern.

2. The brushless motor according to claim 1, wherein the drive/control circuit is configured to supply a current of a substantially sinusoidal shape to the stator coil.

3. The brushless motor according to claim 1, wherein an attachment part to an apparatus to be equipped with the motor is formed on the housing.

4. The brushless motor according to claim 2, wherein an attachment part to an apparatus to be equipped with the motor is formed on the housing.

5. The brushless motor according to claim 1, wherein the drive/control integrated circuit, the electronic components for surface mounting and the Hall element are located within a projection range of an outer diameter of the rotor yoke of the circuit substrate.

6. The brushless motor according to claim 1, wherein the magnet of the rotor is a rare earth isotropic resin magnet.

7. A brushless motor comprising:
    a stator core being wound therearound with a stator coil;
    a rotor including a cup-shaped rotor yoke attached on the inner peripheral side with a ring-shaped magnet being arranged to face the stator core and having magnetized a plurality of poles for driving along a circumferential direction on the inner periphery, and a shaft fixed at the center of the rotor yoke;
    a bearing for journaling the shaft in a freely rotating manner;
    a housing for holding the bearing on the inner peripheral side and holding the stator core on the outer peripheral side;
    a Hall element for detecting a position in a rotating direction of the magnet of the rotor;
    a speed detector for detecting the rotating speed of the rotor; and
    a circuit substrate fixed to the housing and equipped with a drive/control circuit for rotatably driving and controlling the rotor, wherein
    the speed detector comprises:
    a plurality of magnetized portions located at an end face of the magnet in a circumferential direction thereof on an open end side of the rotor;
    a speed detecting pattern comprising a plurality of generator wire elements connected circularly in series along the entire circumference of the circuit substrate, at a position corresponding to the magnetized portions and on the side facing the end face of the magnet of the rotor, so that a length in a radial direction of each generator wire element is equal to or greater than a length in a radial direction of the magnetized portions, the generator wire elements being the same in number as poles of the magnetized portions located on the circuit substrate; and
    a cancel pattern located at one of the external side and the internal side of the speed detecting pattern so as to surround the speed detecting pattern, the cancel pattern being connected in series with the speed detecting pattern,
    the Hall element being located on a surface of the circuit substrate on the side opposite to the surface located with the speed detector.

* * * * *